United States Patent [19]

Matsuyama

[11] 4,346,450

[45] Aug. 24, 1982

[54] ELECTRONIC CALCULATOR HAVING ITEM COUNT DISPLAY

[75] Inventor: Shigeru Matsuyama, Tokyo, Japan

[73] Assignee: Canon Kabushiki Kaisha, Tokyo, Japan

[21] Appl. No.: 123,210

[22] Filed: Feb. 21, 1980

[30] Foreign Application Priority Data

Mar. 3, 1979 [JP] Japan .............................. 54-24052

[51] Int. Cl.³ .............................................. G06F 3/14
[52] U.S. Cl. .................................. 364/710; 364/900
[58] Field of Search ............................. 364/710, 900

[56] References Cited

U.S. PATENT DOCUMENTS

| | | | |
|---|---|---|---|
| 4,138,734 | 2/1979 | Nakata et al. | 364/710 |
| 4,156,281 | 5/1979 | Hirano et al. | 364/710 X |
| 4,177,520 | 12/1979 | Meff | 364/900 |
| 4,217,656 | 8/1980 | Hirano et al. | 364/710 |

*Primary Examiner*—David H. Malzahn
*Attorney, Agent, or Firm*—Fitzpatrick, Cella, Harper & Scinto

[57] ABSTRACT

The present invention provides an electronic apparatus for providing plural information, capable of displaying, while the addition or subtraction key is depressed, the item count indicating the number of actuations of the addition or subtraction key, and displaying the result of calculation obtained up to such key actuation when the key is released from the depressed state.

6 Claims, 1 Drawing Figure

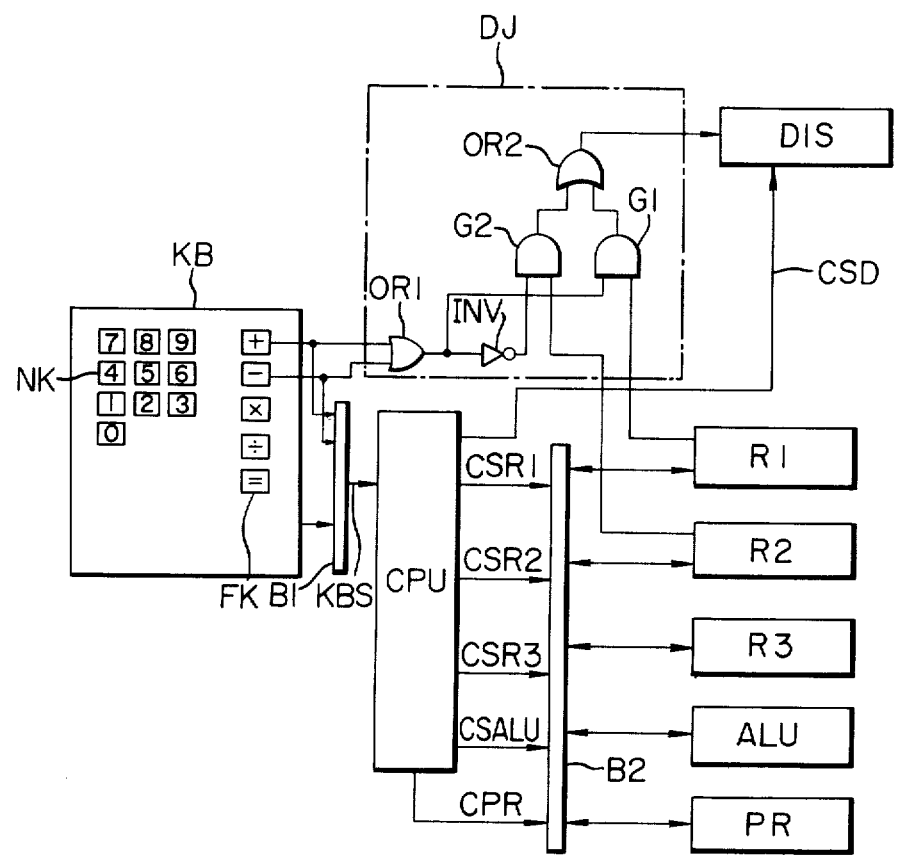

ELECTRONIC CALCULATOR HAVING ITEM COUNT DISPLAY

BACKGROUND OF THE INVENTION

1. Field of the Invention

The present invention relates to an electronic apparatus capable of providing plural information.

2. Description of the Prior Art

In the summation of business forms or data with serial numbers it is helpful, in preventing errors in the summation, to obtain the item count, which is the number of actuations of the addition or subtraction key, and to have the item count printed together with the result of the summation when the print instruction key is actuated. However, when such a scheme is implemented the item count can be checked only when it is printed on the recording paper in response to the actuation of the print instruction key, and cannot therefore be confirmed when the result of summation is not printed. Also, an interim printing operation for the purpose of verifying the item count during the course of a series of calculation is not desirable in case the recording paper is remaining little nearly depleted or has to be economized. Furthermore, in the course of summation of many similar items of data with corresponding serial numbers, the confirmation of the last entered items of data can only be made by the comparison of the obtained print with the data or by the confirmation of the item count printed together with the interim result, and cannot therefore be achieved if the recording paper is not in use.

Furthermore, in case of providing plural information such as the data of calculation and the item count, simultaneous output of these information inevitably requires an increased number of digits in the output device.

SUMMARY OF THE INVENTION

The object of the present invention is to provide an electronic apparatus which overcomes the above-mentioned drawbacks in the prior art and which is capable of efficiently providing plural information, for example the item count and the data indicating the process of calculation.

Another object of the present invention is to provide an electronic apparatus capable of providing plural information and adapted for providing desired information, such as the item count, for a period of operation.

Still another object of the present invention is to provide an electronic apparatus capable of providing plural information by means of simple key operations.

Still another object of the present invention is to provide an electronic apparatus capable of providing plural information, and capable of providing the item count upon each actuation of the addition or subtraction key.

BRIEF DESCRIPTION OF THE DRAWING

The attached drawing is a block diagram of an electronic apparatus capable of providing plural information and embodying the present invention.

DESCRIPTION OF THE PREFERRED EMBODIMENT

The present invention will be clarified in detail by the following description to be taken in conjunction with the attached drawing. The drawing represents an example of electronic calculator embodying the present invention, in which a keyboard KB is provided with numeral keys NK for entering numerals 0-9, and function keys FK including an addition key "+", a subtraction key "−", a multiplication key "×", a division key "÷" and an execution key "=". Each of these keys is composed of a well-known push-button switch which is closed upon depression with a finger to generate a corresponding key signal and is opened upon release of the external pressure to terminate said key signal.

CPU is a central processing unit for controlling the calculation and display by receiving signals KBS, supplied from the keyboard KB through a bus line B1, and the signals from other circuits, and by supplying control signals CSD, CSR1-CSR3, CSALU etc. to other circuits to be explained later. R1, R2 and R3 are 4-bit parallel registers for storing and transferring data in response to the control signals CSR1, CSR2 and CSR3 supplied from the central processing unit CPU. More specifically said registers R1, R2 and R3 are used respectively for storing the item count indicating the number of actuations of said addition and subtraction keys, the cumulative result of addition and subtraction and the entered numerical data. ALU is an arithmetic logic unit for executing the calculations such as addition and subtraction on the data supplied through a bus line B2 in response to a control signal CSALU from the central processing unit CPU. DIS is a display unit adapted, under the control by a display junction unit DJ, to display the content of the item count register R1 while the addition key "+" or the subtraction key "−" is depressed and to display the content of the result register R2 when said key is released. PR is a printer unit capable, as in the ordinary printing unit employed in a conventional calculator, of recording the numerical data entered by the numerical keys NK and stored in the input data register R3, and of recording the content of the item count register R1 when the execution key "=" is actuated, in response to the control signals from the central processing unit CPU.

The above-mentioned display junction unit DJ can be composed of an inverter INV, AND gates G1 and G2, and OR gates OR1 and OR2 as shown in the attached drawing, and is adapted to supply the addition key signal or subtraction key signal through the gate OR1 directly to the AND gate G1 and through the inverter INV to the AND gate G2. The gates G1 and G2 receive the contents of the registers R1 and R2, respectively and supply output signals to the display unit DIS through the gate OR2, whereby the display unit DIS displays the content of the register R1 through the AND gate G1 when the addition or subtraction key is depressed, while it displays the result of addition and subtraction stored in the register R2 through the AND gate G2 when the addition or subtraction key is not depressed.

In the electronic calculator of the above-explained structure, the numerical input from the numeral keys NK is stored in the register R3 and simultaneously displayed on the display unit DIS. In the execution of addition or subtraction by the addition key "+" or subtraction key "−" in the function key FK, the number of keys actuations is cumulatively stored in the register R1 in response to the depression of said addition or subtraction key, and simultaneously the arithmetic logic unit ALU executes the addition or subtraction on the data entered by said numeral keys NK and stored in the register R3, under the control by the central processing unit CPU, and stores the result of addition or subtraction in the register R2. If the addition key or subtraction key is still depressed, the content of the register R1 representing the item count is displayed on the display unit DIS through the display junction unit DJ, and if said keys are no longer depressed, the display unit DIS displays the content of the register R2 through the display junction unit DJ. The aforementioned printer unit PR only records the input data stored in the register R3 in response to the actuation of the addition or subtraction key, but does not perform the printing of the content of the register R1. The above-mentioned procedure is repeated in the subsequent additions and subtractions, and the item count is displayed only when the addition or subtraction key is depressed.

Finally in response to the actuation of the execution key "=", the display unit DIS displays the result of calculations stored in the register R2, and the printer unit PR records the content of said register R2 as well as the item count stored in said register R1.

In the following, the display on the display unit DIS and the recording by the printer unit PR in an example of calculations 110+120+130=360 are explained.

In response to an entry of "110" by the numeral keys NK the display unit DIS displays the data "110" but the printer unit PR performs no printing in this stage. Upon subsequently depression of the addition key "+", the display unit DIS displays the item count "1" during said depression and displays the result of calculation "110" instead of said item count when said key is released. Also the printer unit PR prints "110+".

Upon subsequent carry entry of the data "120", the display unit DIS displays "120". In response to the subsequent depression of the addition key "+", the display unit DIS displays the item count "2" during said depression and displays the result of calculation "230" (=110+120) instead of said item count when said key is released. Also the printer unit PR prints "120+".

Upon subsequent entry of the data "130", the display unit DIS displays "130". In response to the subsequent depression of the execution key "=", the display unit DIS displays the result of calculation "360". At the same time the printer unit PR prints "130", and, after line feed, prints the item count and the result of calculation in the form of "3 360=".

I claim:

1. An electronic apparatus for providing plural information, comprising:
   calculation instruction means for generating calculation instructions;
   first memory means connected to said calculation instruction means for memorizing a number corresponding to the number of operations of said calculation instruction means;
   data input means for entering data;
   processor means connected to said calculation instruction means and to said data input means for operating on said entered data in accordance with said calculation instructions to produce a calculation result;
   second memory means connected to said processor means for memorizing said calculation result; and
   output means connected to said first memory means, to said second memory means and to said calculation instruction means for outputting the content of said first memory means in one drive mode of said calculation instruction means and the content of said second memory means in another drive mode of said calculation instruction means.

2. An electronic apparatus according to the claim 1, wherein said calculation instruction means at least comprises addition instruction means and subtraction instruction means.

3. An electronic apparatus according to the claim 1, wherein said output means comprises display means for visual display of the output from said first and said second memory means.

4. An electronic apparatus according to the claim 1, wherein said data input means at least comprises numeral input means for entering numerals 0 to 9.

5. An electronic apparatus for providing plural information, comprising:
   data input means for entering data;
   addition instruction means for instructing the addition of data entered by said data input means;
   subtraction instrument means for instructing the subtraction of data entered by said data input means;
   memory means connected to said addition instruction means and to said subtraction instruction means for storing a number corresponding to the number of operations of said addition instruction means and to the number of operations of said subtraction instruction means;
   processor means connected to said data input means, to said addition instruction means, and to said subtraction instruction means for operating on said entered data in accordance with said addition instruction or said subtraction instruction to produce a calculation result; and
   output means connected to said processor means and to said memory means for providing the number stored in said memory means in a period between the output of the result of calculation in response to an instruction from said addition instruction means or from said subtraction instruction means and for providing the result of calculation in response to a subsequent instruction from said addition instruction means or from said subtraction instruction means.

6. An electronic apparatus according to the claim 5, wherein said output means comprises control means for providing the number stored in said memory means upon initiation of an operation of said addition instruction means or upon initiation of an operation of said subtraction instruction means, and for providing said calculation result upon completion of said operations.

* * * * *